United States Patent Office 2,852,576
Patented Sept. 16, 1958

2,852,576

MIXTURE OF CERTAIN METAL HYDRIDES WITH SOLID ACIDIC PROMOTERS AS CATALYSTS FOR AROMATIC ALKYLATION

Peter Fotis, Jr., Highland, Ind., and Donald L. Esmay, Minneapolis, Minn., assignors to Standard Oil Company, Chicago, Ill., a corporation of Indiana No Drawing. Application April 6, 1955
Serial No. 499,760

15 Claims. (Cl. 260—671)

This invention relates to an improved process for the nuclear alkylation of aromatic hydrocarbons by olefinic alkylating agents. In one specific aspect, this invention relates to a process for the alkylation of nuclearly alkylatable aromatic hydrocarbons by acyclic olefins in the presence of catalysts consisting essentially of a mixture of defined metal hydrides with a composite solid acidic silica-promoter metal oxide catalyst.

Composite solid acidic silica-base catalysts are well known for use in the catalytic cracking of high boiling hydrocarbon oils, such as petroleum gas oils, to produce gasoline. These catalysts comprise a major proportion by weight of silica, usually in an activated high surface form such as a gel, and a minor proportion, usually of the order of about 5 to about 30 weight percent of a promoting metal oxide such as alumina, magnesia, titania or zirconia. The catalysts may be synthetic materials or they may be prepared by acid-treating clays, a practice used in the art to prepare catalysts having the trade names of Filtrol, Super-Filtrol and the like.

Composite solid acidic silica-alumina catalysts comprising a minor proportion by weight of alumina have heretofore been employed as catalysts in processes for the nuclear alkylation of aromatic hydrocarbons by olefins such as ethylene, propylene, butylenes and the like, usually at temperatures of at least 400° F. and preferably at least 475° F., extending up to about 700° F. (note U. S. P. 2,419,796).

In the commercial production of ethylbenzene by the reaction of benzene with ethylene under high pressures of the order of 900 p. s. i. g. in the presence of a silica gel-alumina catalyst, temperatures of 590° F. and higher are employed (F. R. Garner and R. L. Iverson, "Ethylbenzene as a Major Petrochemical," a paper presented as a part of a "Symposium on Petrochemicals in the Post-War Years—No. 28," sponsored by the Division of Petroleum Chemistry of the American Chemical Society, September 6–11, 1953).

The use of acidic silica-alumina catalysts for the vapor phase alkylation of benzene with low molecular weight olefins has been reviewed and studied experimentally by A. A. O'Kelly et al. (Ind. Eng. Chem. 39, 154–8 (February 1947)). These investigators employed temperatures of 322° C. to 399° C. (about 612° F. to 750° F.), in batch vapor phase ethylations of benzene with ethylene in the presence of a synthetic silica-alumina catalyst. They employed temperatures of 428° C. to 496° C. (about 802° F. to 924° F.) in continuous operations.

The conversion of silica to an acidic catalyst requires the addition of only a very small proportion of alumina (less than 1 w. percent), although commercial catalysts may contain as much as 25 weight percent of alumina, usually about 5 to 20 weight percent. The acidic silica-alumina catalysts in the so-called "dry" state may contain about 1 to 10 weight percent water. Some water is carried as hydroxyl groups on the surface of the catalyst (R. C. Hansford in "Advances in Catalysis," vol. IV, page 7; and A. G. Oblad in "Advances in Catalysis," vol. III, pages 210 and 211). The acid strength of solid materials can be determined by the method of Cheves Walling (J. Am. Chem. Soc. 72, 1164 (1950)) or other methods known in the art.

One object of our invention is to provide an improved catalytic process for the reaction of olefins with nuclearly alkylatable aromatic hydrocarbons to produce nuclear alkyl derivatives of said aromatic hydrocarbons. Another object is to increase the rate of reaction and/or permit the use of lower reaction temperatures in the nuclear alkylation of aromatic hydrocarbons by olefins. An additional object of our invention is to provide means for greatly increasing the desired catalytic activity of acidic solid composite metal oxide catalysts which are employed to accelerate the alkylation process of the present invention. Yet another object is to provide new and improved combinations of catalysts for nuclear alkylation processes of the type described. These and other objects and advantages of our invention will become apparent from the ensuing description thereof.

In substance, we have discovered that the addition of the hydride of an alkali metal and/or alkaline earth metal to a composite solid acidic catalyst comprising a major proportion of silica and a minor proportion of an activating metal oxide greatly increases the activity of said solid metal oxide catalyst in the nuclear alkylation of aromatic hydrocarbons by olefins. The theoretical basis for the improvement which forms the subject matter of the present invention is not known to us, nor have we been able to find a reasonable explanation of the phenomenon or phenomena involved in a review of the pertinent literature. The fact that the catalytic activity of the metal oxide catalysts is enhanced is evidenced by increased rate of alkylation, the availability of lower alkylation temperatures than could otherwise be used, increased resistance of the catalyst to poisons, increased catalyst life, etc.

Briefly, in accordance with the present invention the nuclearly alkylatable aromatic hydrocarbon charging stock is contacted with an olefinic alkylating agent in the presence of physically discrete particles (e. g., powders or pellets) of the selected metal hydride and the selected metal oxide catalyst, for example, a commercial silica-alumina cracking-type catalyst, under the selected alkylation conditions for a suitable period of time, following which the alkylation products are separated by conventional means from the solid catalysts and treated by conventional means to separate alkylation products from unconverted charging stocks, which may be recycled as desired to the alkylation process. The alkylation conditions which are selected are not critical, since the present process is operable over a broad range of temperatures, pressures, molar ratios of aromatic hydrocarbon; olefin alkylating agents, catalyst concentration, contact time, etc.

In order to illustrate but not unnecessarily to delimit the present invention, the following examples are offered.

*Example 1*

A commercial silica-alumina cracking catalyst comprising 86 weight percent of silica and 14 weight percent of alumina was dried in a muffle furnace at 500° C. at atmospheric pressure for 17 hours, following which 10 g. of the dried catalyst were transferred to a 250 ml. stainless steel autoclave provided with a stirring mechanism. The autoclave was charged with 100 ml. of dried benzene and 1.5 g. of sodium hydride. The autoclave was pressure-tested with nitrogen and then pressured with commercial cylinder ethylene to about 500 p. s. i. at 25° C. Then the contents of the autoclave were slowly heated. It was found that reaction set in at about 90° C. and an initial ethylene pressure of about 1000 p. s. i., as evidenced by a drop in the partial pressure of ethylene in the autoclave. More rapid reaction was obtained at 150° C. Following the reaction, the autoclave was allowed to cool to room temperature, gases were bled off to atmospheric pressure, liquid products were filtered from the solid catalysts and the liquid was fractionally distilled to recover unconverted aromatic feed stock and alkylation products. It was found that after 18 hours of reaction, 68 v. percent of the benzene charge had been ethylated to produce predominantly ethylbenzene, with smaller proportions of diethylbenzenes and some triethylbenzene. The composition of the distillate was 75 v. percent ethylbenzene, 20 v. percent diethylbenzene and 5 v. percent triethylbenzenes. The nature of the polyalkylation products indicates that an acid-type catalysis is involved here, since successive alkylation of the aromatic nucleus occurred. In alkali-type catalysis, the second alkylation would occur in a side chain containing an alpha C–H bond; thus, alkali-type ethylation of ethylbenzene yields 2-phenylbutane rather than diethylbenzene.

Under otherwise idential conditions but when no sodium hydride was added to the catalyst, the benzene conversion was 57 v. percent.

Example 2

The 250 ml. stirring autoclave was charged with 100 ml. of toluene, 1.5 g. of powdered sodium hydride and 10 g. of a commercial silica-alumina cracking catalyst containing 86 weight percent silica and 14 weight percent alumina. The silica-alumina catalyst was dried before use in a muffle furnace at 345° C. and atmospheric pressure for 17 hours. The contents of the autoclave were maintained at 150° C. under about 1000 p. s. i. of ethylene, with stirring for 5 hours. The reaction mixture was worked up as in Example 1. It was found that 40 v. percent of the toluene was converted to ethyltoluene containing a few percent of diethyltoluenes.

Example 3

The autoclave was charged as before with toluene, sodium hydride and the dried silica-alumina catalyst, but 30 g. of 2-butene were substituted for the ethylene of Example 2. The contents of the autoclave were heated with stirring for 2 hours at 113° C., resulting in rapid alkylation. The products were worked up as in Example 2. It was found that 59 v. percent of the toluene was converted to nuclear butyl derivatives, viz., 70 v. percent of 2-p-tolylbutane and 30 v. percent of polybutyl toluenes.

Example 4

The reactor and operating procedure of Example 2 were used but the reactants were 100 ml. of t-butylbenzene and 34 g. of commercial cylinder propylene. A very rapid alkylation reaction was obtained at temperatures between 90° C. and 100° C. After one-half hour under these conditions, it was found that 60 v. percent of the t-butylbenzene was converted to nuclear isopropyl derivatives, viz., 62 v. percent of mono-, 23 v. percent of di- and 15 v. percent of poly-alkylates.

Example 5

The 250 ml. stirring autoclave was charged with 10 g. of the silica-alumina catalyst of the composition of that used in Example 2, dried by the same technique; then with 100 ml. of redistilled and dried benzene and with 1.5 g. of commercial powdered lithium hydride. Ethylene was then pressured into the reactor and the contents were heated with stirring for 5 hours at 150° C. under initial partial pressure of 1000 p. s. i. It was found that 56 v. percent of the benzene charged was converted to mono- and polyethyl derivatives having the following distribution: 75 v. percent ethylbenzene, 20 v. percent diethylbenzenes and 2 v. percent triethylbenzenes.

Example 6

The 250 ml. stirring autoclave was charged with 10 g. of the silica-alumina catalsyt of the composition of that used in Example 2, dried by the same technique; then with 100 ml. of redistilled and dried benzene and with 1.5 g. of commercial powdered calcium hydride. Ethylene was then pressured into the reactor and the contents were heated with stirring for 5 hours at 150° C. under initial partial pressure of 1000 p. s. i. It was found that 61 v. percent of the benzene charged was converted to mono- and polyethyl derivatives having the following distribution: 60 v. percent ethylbenzene, 30 v. percent diethylbenzenes and 5 v. percent triethylbenzenes.

The above examples are merely illustrative of the broad scope of our invention, which will be described in further detail hereinafter.

A wide variety of nuclearly alkylatable aromatic hydrocarbons may be employed as charging stocks, singly or in mixtures with each other or with substantially inert solvents or diluents such as saturated hydrocarbons (0 to 300 v. percent of diluent, based on the aromatic hydrocarbon charging stock). Thus, the nuclearly alkylatable hydrocarbon feed may comprise benzene and its homologues, viz. the alkylbenzenes containing at least one alkylatable nuclear carbon atom, for example, as in the various monoalkylbenzenes and polyalkylbenzenes such as toluene, ethylbenzene, isooctylbenzene, n-dodecylbenzene, xylenes, n-propylbenzene, isopropylbenzene, t-butylbenzene, meta-di-t-butylbenzene, pseudocumene and the like. The aromatic feed stock may also contain a cyclic alkylbenzene such as cyclopentylbenzene, t-methylcyclopentylbenzene, cyclohexylbenzene or compounds which behave similiarly in the present process, for example tetralin. The aromatic feed stock may be, or may contain, a polycyclic aromatic hydrocarbon containing at least one alkylatable nuclear carbon atom. Aromatic heterocyclics such as pyridine, picolines, lutidines, quinoline, isoquinoline, carbazole, furan, thiophene, etc. may also be alkylated by the process of this invention or by simple variants thereof. Other nuclearly alkylatable aromatic charging stocks for the present process will readily suggest themselves to those who are skilled in the art.

A wide variety of olefinic charging stocks can be used in the process of the present invention. In particular, a variety of acyclic monoolefinic hydrocarbons can be employed and of these, the terminal or alpha-olefins are preferred, namely, olefins which have the structural formula $RCH=CH_2$ wherein R represents a hydrogen atom or a hydrocarbon radical. Cyclic olefins such as cylopentene, cyclohexene, cyclooctene and the like may also be used but, in general, react at a lower rate with the aromatic hydrocarbons than the acyclic, terminal olefins. Specific examples of suitable olefins are ethylene, propylene, 1-butene, 2-butene, isobutylene, 1-pentene, 1-octene, 1-dodecene, 1-octadecene, 2-pentene, dicyclopentadiene, 4-vinyl cyclohexene, diallyl, 1,5-cyclooctadiene, limonene, styrene, etc. When readily polymerizable olefins such as styrene are used, it is necessary to maintain a large instantaneous molar excess of the aromatic hydrocarbon feed stock in the reactor in order to minimize olefin polymerization; thus, the olefin may be introduced slowly and in small proportions into a relatively large proportion of the aromatic hydrocarbon, in order to obtain a molar ratio of 4 to 20, or even 100 mols of aromatic hydrocarbon (or even more) per mol of the olefinic alkylating agent in the reaction zone.

A wide variety of composite solid acidic catalysts comprising a major proportion by weight of silica and a minor proportion by weight of one or more promoting metal oxides can be used, of which the commercial silica-alumina, silica-alumina-zirconia and silica-magnesia, hydrocarbon cracking catalysts are preferred, principally because of their relatively low cost and the ease with which they can be obtained. The promoting metal oxide which is used with the silica usually constitutes about 1 to about 35 weight percent of the solid, acidic composite, more often about 10 to 25 weight percent. Before use, the composite solid metal oxide catalysts are dried under suitable conditions, for example, at temperatures within the range of about 200 to 600° C. at atmospheric or lower pressures.

The alkali metal hydrides are the hydrides of lithium, sodium, potassium, rubidium and cesium. Mixtures of alkali metal hydrides with each other or alkaline earth metal hydrides may be used together with the solid metal oxide catalysts to effect the alkylation process of the present invention. The alkaline earth metal hydrides are the hydrides of beryllium, magnesium, calcium, strontium and barium.

The metal hydride may be used in concentrations of about 0.5 to about 20% by weight of the solid acid catalyst, but is more often employed in concentrations between about 5 and about 15 weight percent.

The metal hydride and solid metal oxide catalysts are usually added as discrete physical masses to the reaction zone, although other techniques can be used. Thus, if desired, the metal oxide and metal hydride catalysts may be ground together prior to use or may be pelleted to yield pellets containing both metal hydride and metal oxide before use.

Strangely, efforts to prepare the so-called high surface metal hydrides on siliceous catalysts, which involved absorbing molten alkali metal on the siliceous catalyst, followed by hydrogen treatment to convert the alkali metal to hydride, failed to yield active alkylation catalysts. There is some reason to believe that when a molten alkali metal is absorbed on a siliceous solid, the alkali metal is converted to a complex or compound which does not react as expected; for example, it does not react with methanol to generate the theoretical quantity of hydrogen.

The alkylation reaction can be conveniently effected at temperatures within the general range of 80° C. to about 200° C. Although higher temperatures up to about 300° C. can be employed, they are usualy not significantly advantageous. Usually we prefer alkylation temperatures in the range of about 120 to about 160° C. Although ethylene alkylates benzene at a very low rate at temperatures below about 200° C. over silica-alumina catalysts, it alkylates benzene and similar aromatic hydrocarbons readily even at temperatures of 90 or 100° C. in the presence of our catalysts.

The alkylations are usually conducted under autogenous pressure. However, if desired, the reaction zone can be supplied with gases such as dry nitrogen, hydrogen, normally gaseous paraffinic hydrocarbons, or substantially inert liquid solvents or diluents which have an appreciable partial pressure under the reaction conditions, for example, pressures between about 25 and about 500 p. s. i.

The alkylation reactions can be effected in conventional equipment, on a batch or continuous basis, with the usual provisions for recycle of various unconverted or partially converted reaction mixture components to the reaction zone.

Having thus described our invention, what we claim is:

1. A process for the nuclear alkylation of a nuclearly alkylatable aromatic hydrocarbon, which process comprises contacting said aromatic hydrocarbon under alkylation conditions with an olefin in the presence of a mixture of physically discrete particles of: (1) a hydride of a metal selected from the class consisting of alkali metals and alkaline earth metals and (2) a composite solid acidic catalyst comprising a major proportion by weight of silica and a minor proportion by weight of a promoting metal oxide selected from the class consisting of magnesia, alumina, titania and zirconia, and recovering alkylate thus produced.

2. The process of claim 1 wherein said hydride is an alkali metal hydride and said composite solid acidic catalyst is a silica-alumina catalyst.

3. The process of claim 1 wherein said hydride is an alkaline earth metal hydride and said composite solid acidic catalyst is a silica-alumina catalyst.

4. The process of claim 1 wherein the concentration of said metal hydride is between about 0.5 and about 20% by weight of said composite solid acidic catalyst.

5. The process which comprises contacting a nuclearly alkylatable hydrocarbon of the benzene homologous series with an acyclic monoolefinic hydrocarbon under alkylation conditions in the presence of a mixture of physically discrete particles of: (1) a hydride of a metal selected from the class consisting of alkali metals and alkaline earth metals and (2) a composite solid acidic catalyst comprising a major proportion by weight of silica and a minor proportion by weight of a promoting metal oxide selected from the class consisting of magnesia, alumina, titania and zirconia, and recovering alkylate thus produced.

6. The process of claim 5 wherein said hydride is an alkali metal hydride and said composite solid acidic catalyst is a silica-alumina catalyst.

7. The process of claim 5 wherein said hydride is an alkaline earth metal hydride and said composite solid acidic catalyst is a silica-alumina catalyst.

8. The process of claim 5 wherein the alkylation temperature is selected between about 80° C. and about 200° C.

9. The process which comprises contacting a nuclearly alkylatable hydrocarbon of the benzene homologous series with ethylene at an alkylation temperature between about 90° C. and about 160° C. in the presence of a mixture of physically discrete particles of: (1) a hydride of a metal selected from the class consisting of alkali metals and alkaline earth metals and (2) a composite solid acidic catalyst comprising a major proportion by weight of silica and a minor proportion by weight of a promoting metal oxide selected from the class consisting of magnesia, alumina, titania and zirconia, and recovering alkylate thus produced.

10. The process of claim 9 wherein said alkylatable hydrocarbon is benzene, said metal hydride is sodium hydride, and said solid catalyst is a silica-alumina catalyst.

11. The process of claim 9 wherein said metal hydride is lithium hydride, and said solid catalyst is a silica-alumina catalyst.

12. The process of claim 9 wherein said metal hydride is calcium hydride, and said solid catalyst is a silica-alumina catalyst.

13. The process of claim 9 wherein said alkylatable hydrocarbon is toluene, said metal hydride is sodium hydride, and said solid catalyst is a silica-alumina catalyst.

14. A process for the propylation of t-butylbenzene which comprises contacting t-butylbenzene and propylene under alkylation conditions with a mixture of physically discrete particles of sodium hydride and of an acidic silica-alumina catalyst, and separating propylated t-butylbenzenes thus produced.

15. A process for butylating toluene which comprises contacting toluene with 2-butene under alkylation conditions with a mixture of physically discrete particles of sodium hydride and of an acidic silica-alumina catalyst, and separating butylated toluenes thus produced.

References Cited in the file of this patent

UNITED STATES PATENTS

| | | |
|---|---|---|
| 2,419,796 | Schulze | Apr. 29, 1947 |
| 2,623,911 | Corson et al. | Dec. 30, 1952 |
| 2,691,647 | Field et al. | Oct. 12, 1954 |
| 2,728,802 | Closson et al. | Dec. 27, 1955 |
| 2,754,338 | Pines | July 10, 1956 |

FOREIGN PATENTS

| | | |
|---|---|---|
| 613,926 | Great Britain | Dec. 7, 1948 |